United States Patent
Motegi et al.

[11] Patent Number: 5,981,051
[45] Date of Patent: Nov. 9, 1999

[54] METHOD FOR PRODUCING GRANULAR POLYCARBONATE PREPOLYMER FOR SOLID-STATE POLYMERIZATION

[75] Inventors: Hiroaki Motegi, Ichihara; Noriyuki Kunishi; Akihiro Shishikura, both of Ichiharashi, all of Japan

[73] Assignee: Idemitsu Petrochemical Co., Ltd., Tokyo, Japan

[21] Appl. No.: 09/029,069

[22] PCT Filed: Jul. 22, 1996

[86] PCT No.: PCT/JP96/02046

§ 371 Date: Mar. 2, 1998

§ 102(e) Date: Mar. 2, 1998

[87] PCT Pub. No.: WO97/08227

PCT Pub. Date: Mar. 6, 1997

[30] Foreign Application Priority Data

Aug. 31, 1995 [JP] Japan .................................. 7-223630

[51] Int. Cl.$^6$ ........................................................ B32B 3/26
[52] U.S. Cl. .................... 428/304.4; 528/491; 528/492; 528/493; 528/494; 528/495; 528/496; 528/502; 528/503; 524/81; 524/220; 524/222; 524/356; 524/366; 524/367; 428/143; 428/147; 428/402

[58] Field of Search ..................................... 528/491, 492, 528/493, 494, 495, 496, 502, 503; 524/81, 220, 222, 356, 366, 367; 428/402, 143, 147, 304.4

[56] References Cited

U.S. PATENT DOCUMENTS

5,204,377  4/1993  Fukawa et al. ........................... 521/60

*Primary Examiner*—Samuel A. Acquah
*Attorney, Agent, or Firm*—Oblon, Spivak, McClelland, Maier & Neustadt, P.C.

[57] ABSTRACT

Provided is a method for producing a granular polycarbonate prepolymer for solid-phase polymerization, comprising dissolving a polycarbonate prepolymer in a solvent under heat, then crystallizing it by cooling, and shaping it. The grains of the granular prepolymer hardly fuse together in polymerization, and the granular prepolymer is suitable for high-speed solid-phase polymerization to give polycarbonate.

12 Claims, 4 Drawing Sheets

METHOD FOR PRODUCING GRANULAR POLYCARBONATE PREPOLYMER FOR SOLID-STATE POLYMERIZATION

TECHNICAL FIELD

The present invention relates to a method for producing a granular prepolymer that is suitable as a material to be put into a polymerization reactor to be polymerized therein into polycarbonate through solid-phase polymerization.

BACKGROUND ART

For protecting the environment, many novel processes of producing polycarbonate are being developed in place of conventional interfacial polymerization using methylene chloride, and melt transesterification and solid-phase polymerization have been proposed.

Of those, solid-phase polymerization is specifically noted, as being effected at relatively low temperatures to give polycarbonate products of high quality.

It has heretofore been said that the starting polycarbonate prepolymer to be put into a polymerization reactor to be polymerized therein into polycarbonate through solid-phase polymerization is desirably a porous crystalline one having a number-average molecular weight of from 1,000 to 15,000, having a hydroxyl group and an arylcarbonate group at its terminals in a ratio of from 5/95 to 95/5, having a specific surface area of not smaller than $0.2 \text{ m}^2/\text{g}$, and having a degree of crystallinity of not smaller than 5 (see Unexamined Published Japanese Patent Application No. Hei-3-223330).

For producing such a porous and crystalline polycarbonate prepolymer of that type, disclosed is a method comprising introducing a solid or melt of a prepolymer as obtained through prepolymerization, into a crystallizing solvent, followed by grinding it therein under high shear into porous and crystalline prepolymer grains having an average grain size of not larger than $250\mu$.

However, solid-phase polymerization using the granular prepolymer obtained in this method is problematic in that the granular prepolymer is partly fused thereby having some negative influences on the polymerization rate and making it difficult to take the polymer product out of the reactor.

Such technical troubles are peculiar to the solid-phase polymerization, and it is desired to clarify the reasons for those troubles and to solve them.

DISCLOSURE OF THE INVENTION

We, the present inventors have assiduously studied in order to solve the problems noted above, and, as a result, have found that the partial fusion of the granular prepolymer in its solid-phase polymerization would be caused by much fine powder existing in the granular prepolymer, that the solid-phase polymerization rate is often governed by the diffusion rate of phenol, and that the increase in the specific surface area of the prepolymer grains to be polymerized is effective in increasing the polymerization rate of the prepolymer. On the basis of these findings, we have developed a method for producing a granular prepolymer having an increased specific surface area and containing a reduced amount of fine powder, and have completed the present invention.

Specifically, the invention is summarized as follows:

(1) A method for producing a granular polycarbonate prepolymer for solid-phase polymerization, comprising dissolving a polycarbonate prepolymer in a solvent under heat, then cooling it to be crystallized, and thereafter shaping it to be granular.

(2) The method for producing a granular polycarbonate prepolymer for solid-phase polymerization of (1), wherein the solvent is a sole aromatic solvent or a mixture of an aromatic solvent and a poor solvent for the polycarbonate prepolymer.

(3) The method for producing a granular polycarbonate prepolymer for solid-phase polymerization of (1) or (2), wherein the concentration of the polycarbonate prepolymer in its solution is from 20 to 90% by weight.

(4) The method for producing a granular polycarbonate prepolymer for solid-phase polymerization of any of (1) to (3), wherein the hot prepolymer solution is passed through a tubular condenser to make the prepolymer crystallized therethrough, and the resulting strand is taken out and cut into pieces having a predetermined length.

(5) The method for producing a granular polycarbonate prepolymer for solid-phase polymerization of any of (1) to (3), wherein drops of the hot prepolymer solution are contacted with cooling gas to make the prepolymer crystallized.

(6) The method for producing a granular polycarbonate prepolymer for solid-phase polymerization of any of (1) to (5), wherein the granular prepolymer has a specific surface area of not smaller than $1 \text{ m}^2/\text{g}$.

(7) The method for producing a granular polycarbonate prepolymer for solid-phase polymerization of any of (1) to (6), wherein the granular prepolymer contains fine powder in an amount of not larger than 5% by weight.

BEST MODES OF CARRYING OUT THE INVENTION

Now, the invention is described in detail hereinunder.

The method of the invention for producing the granular material for solid-phase polymerization comprises a plurality of steps, which are separately described below.

The granular material for solid-phase polymerization is produced through (a) a step of producing a polycarbonate prepolymer, (b) a step of dissolving it in a solvent, (c) a step of crystallizing and shaping it, and (d) a step of drying it.

(a) Step of Producing Polycarbonate Prepolymer

The polycarbonate prepolymer to be processed in the invention preferably has a viscosity-average molecular weight of from 1,000 to 30,000, more preferably from 2,000 to 20,000. If the prepolymer has a viscosity-average molecular weight of smaller than 1,000, its pellets formed according to the invention have poor strength and are powdered into fine powder while they are handled. Regarding polycarbonate having a viscosity-average molecular weight of larger than 30,000, its molecular weight is satisfactory for its general use, and there is little necessity for further increasing its molecular weight through additional solid-phase polymerization.

It is desirable that the prepolymer is terminated by a phenyl group and a hydroxyl group, in which the molar ratio of the former to the latter may be generally from 0.1 to 5, but preferably from 0.5 to 2, more preferably from 0.8 to 1.4.

As the solid-phase polymerization of the prepolymer is for condensation to remove the phenol moiety, the ratio of the terminal groups noted above is desirably nearer to 1 for the efficiency of the polymerization.

The prepolymer may be produced in any known method of, for example, interfacial polymerization or melt transesterification. In interfacial polymerization, however, a phenol-terminated prepolymer and a hydroxyl-terminated prepolymer, which are prepared separately, must be blended while controlling the ratio of the both terminal groups. Therefore, preferred is melt transesterification where the ratio of the both terminal groups is easily controlled.

The method of producing prepolymer through melt transesterification is described in detail hereinunder.

As the starting compounds, in general, a combination of a dihydroxy compound and a dicarbonate is used most popularly.

As the dihydroxy compound of the two, preferred are aromatic ones, that is, aromatic dihydroxy compounds because of the physical properties of the polymer to be obtained and for other reasons. Concretely mentioned are dihydroxybiphenyls, such as bis(4-hydroxyphenyl)propane (generally referred to as bisphenol A, BPA).

On the other hand, as the dicarbonate, preferred are diaryl carbonates as being highly reactive. Concretely, diphenyl carbonate (DPC) is one preferred example.

Those two starting compounds, dihydroxy compound and dicarbonate are put into a polymerization reactor. For this, a dihydroxy compound and a dicarbonate are together or separately melted and fed into the reactor; or a powdery dicarbonate is added to a melt of a dihydroxy compound and the resulting melt mixture is fed into the reactor.

For this reaction, any known polymerization reactor is employable. For example, preferred are vertical or horizontal reactors protected with a jacket and equipped with a stirrer. Any of singe-stage reaction or multi-stage reaction is employable, for which one or more reactors as disposed singly, in series or in parallel are used.

For the reaction conditions for producing prepolymer through melt transesterification, the temperature is defined to fall between 100 and 300° C., preferably between 150 and 280° C., and the pressure is to fall between 1 Torr and 5 kg/cm$^2$G, preferably between 10 Torr and 2 kg/cm$^2$G.

Too low reaction temperature does not yield the intended transesterification; while too high reaction temperature is unfavorable, as the starting compound, diphenyl carbonate or the like diffuses out of the reaction system along with the side product, phenol. Too high pressure is unfavorable, as the side product, phenol hardly diffuses out of the system, thereby interfering with the condensation. On the contrary, too low pressure is also unfavorable, as the starting compound, diphenyl carbonate or the like diffuses out of the system, whereby the composition of the reactants in the reaction system varies.

Any of batch-wise or continuous reaction or even a combination of the two is employable, but preferred is continuous reaction for producing uniform prepolymer.

If desired, a polymerization catalyst is used for the reaction. Generally used is an transesterification catalyst, which includes, for example, alkali metal compounds (e.g., lithium hydroxide, sodium hydroxide, potassium hydroxide, etc.); alkaline earth metal compounds; nitrogen-containing basic compounds such as amines, quaternary ammonium salts, etc.; and boron compounds. If used, especially preferred are nitrogen-containing basic compounds of the catalysts noted above, as they are basic and remain little in the reaction system after the reaction.

As the nitrogen-containing basic compounds, for example, preferred are trihexylamine, tetramethylammonium hydroxide, tetrabutylammonium hydroxide, and dimethylpyridine.

The boron compounds include, for example, boric acid, trimethyl borate, triethyl borate, tributyl borate, triheptyl borate, triphenyl borate, trinaphthyl borate, etc.

The amount of the catalyst to be added may be generally from $10^{-8}$ to $10^{-1}$ mol/mol of the starting dihydroxy compound, but preferably from $10^{-7}$ to $10^{-2}$ mol/mol. If the amount of the catalyst is smaller than $10^{-8}$ mol/mol, the catalyst could not exhibit its catalytic activity. If, however, the amount is larger than $10^{-1}$ mol/mol, such will result in worsening the physical properties, especially heat resistance and hydrolysis resistance of the final product, polycarbonate, and even in increasing the production costs. Therefore, addition of too much catalyst over the defined range is unnecessary.

(b) Step of Dissolving Polycarbonate Prepolymer in Solvent

The prepolymer prepared as above is dissolved in a solvent under heat to prepare a prepolymer solution having a prepolymer concentration of generally from 20 to 90% by weight.

The solvent to be used herein shall have such a dissolution characteristic that it dissolves polycarbonate prepolymer under heat and precipitates crystals of the prepolymer when cooled to around room temperature. In other words, employable herein is any solvent capable of dissolving polycarbonate prepolymer and precipitating its crystals in heating-cooling operation. Preferred are aromatic solvents, including, for example, benzene, toluene, o-xylene, m-xylene, p-xylene, dioxane, ethylbenzene, anisole, cumene, propylbenzene, naphthalene, mesitylene, dibenzyl ether, diphenyl ether, tetrahydronaphthalene, phenanthrene, anthracene, cyclohexanone, tetrahydrofuran, etc. One or more of those solvents are usable either singly or as combined.

If desired, the solvent may be combined with a poor solvent for polycarbonate prepolymer within the range substantially not interfering with the dissolution of the prepolymer in the mixed solvent. The poor solvent includes, for example, aliphatic hydrocarbons such as pentane, hexane, heptane, nonane, decane, etc.; ketones such as acetone, ethyl methyl ketone, diethyl ketone, methyl vinyl ketone, mesityl oxide, cyclobutanone, etc.; ethers such as methyl ether, ethyl ether, propyl ether, methyl ethyl ether, methyl propyl ether, ethyl propyl ether, vinyl ether, allyl ether, methyl vinyl ether, etc.; and water. One or more of those poor solvents are usable either singly or as combined.

However, alcohols are not good to add, as their terminal hydroxyl group reacts with prepolymer; and carboxylic acids are also not good, as their carboxyl group reacts with prepolymer.

The concentration of prepolymer in its solution may be generally from 20 to 90% by weight, but preferably from 25 to 85% by weight. If its concentration is lower than 20% by weight, the prepolymer will precipitates only a little, and its shaping is difficult. In addition, the granular prepolymer as obtained from the solution having such a low prepolymer concentration often gives much fine powder while it is handled, as its compression breaking strength is low. If, however, the prepolymer concentration in its solution is larger than 90% by weight, the prepolymer could not be fully crystallized within a predetermined period of time but is often solidified, resulting in that the prepolymer precipitate formed shall have a low degree of crystallization and is often fused during solid-phase polymerization. In addition, the amount per unit volume of the prepolymer as crystallized from its solution having such a high prepolymer concentration increases, resulting in that the prepolymer crystals are dense and have a lowered specific surface area. Use of such dense prepolymer crystals in solid-phase polymerization is unfavorable, as lowering the polymerization rate. Reducing the concentration of prepolymer in its solution results in the increase in the specific surface area of the granular prepolymer to be formed from the solution, but it results in the increase in fine powder to be in the granular prepolymer. Considering this, therefore, the concentration of prepolymer in its solution is controlled to fall within a predetermined range in order to obtain the intended granular prepolymer of the invention.

Specifically, a prepolymer solution having a prepolymer concentration to fall between 20 and 90% by weight gives the intended granular prepolymer having a specific surface area of not smaller than 1 m²/g and having a power content of not larger than 5% by weight.

To form the prepolymer solution, employable is any of batch-wise or continuous system. For the batch-wise system, usable is any ordinary stirring tank, for which preferably used are paddle-type stirrers, propeller-type stirrers, Folder (by Kobe Pantec), Max Blend (by Sumitomo Ship Building and Machinery), Sunmeler (by Mitsubishi Heavy Industries), Full Zone (by Kobe Pantec), etc. Apart from those, also employable is ultrasonication to dissolve prepolymer in a solvent.

To form the prepolymer solution in such a batch-wise system, prepolymer and solvent may be put into the system in any order. However, in order to prepare a high-concentration prepolymer solution in the system, it is desirable to add solvent to prepolymer as the efficiency in stirring the prepolymer solution being prepared may be high.

On the other hand, for the continuous system, generally used is any known stirring device such as line mixer or homogenizer. For example, usable are Pipeline Homomixer (by Tokushu Kikai), Homomic Lineflow (by Tokushu Kikai), Multiline Mixer (by Satake Chemical Machinery), Komatsu Throughser Disintegrator (by Komatsu Zenoa), etc.

Though depending on the solvent used, the dissolution temperature may fall generally between 30 and 300° C., but preferably between 50 and 280° C. Even at a temperature lower than 30° C., some solvents may dissolve prepolymer. In general, however, dissolution at such low temperatures is disadvantageous, since it produces low solubility and requires cooling the system to around room temperature. On the other hand, dissolution at high temperatures above 300° C. is unfavorable, as polymer is deteriorated.

Depending on the condition of the solvent used, pressure may be applied to the dissolution system.

The prepolymer solution prepared as above shall not be kept under heat for a long period of time, since the prepolymer, if heated long, will be deteriorated to change the color of its solution.

The dissolution of prepolymer is desirably effected in an inert gas atmosphere of, for example, nitrogen. It is further desired to bubble nitrogen or the like into the solvent being used, thereby removing dissolved oxygen from the solvent. This is because oxygen, if existing in the granular prepolymer, often deteriorates the prepolymer during polymerization.

A polymerization catalyst such as sodium hydroxide, triethylamine or TMAH may be previously added to the solvent. The catalyst may thus exist in the prepolymer solution prepared, and the granular prepolymer formed from the solution shall contain the catalyst being uniformly dispersed therein, resulting in that the catalyst acts in the solid-phase polymerization of the prepolymer.

To control the ratio of the terminal groups of the prepolymer prepared in the step (a), monomers used in (a) may be added to the prepolymer solution prepared in this step (b).

(c) Step of Crystallizing and Shaping Polycarbonate Prepolymer

This step is to cool the prepolymer solution prepared in the previous step to crystallize and shape the prepolymer into a granular one.

Two concrete methods of forming the granular prepolymer are disclosed herein. One is claimed in claim 4, and is as follows:

(c-1) A method for producing a granular polycarbonate prepolymer for solid-phase polymerization, wherein a hot prepolymer solution is passed through a tubular condenser to make the prepolymer crystallized therethrough, and the resulting strand is taken out and cut into pieces having a predetermined length.

Figure 1:
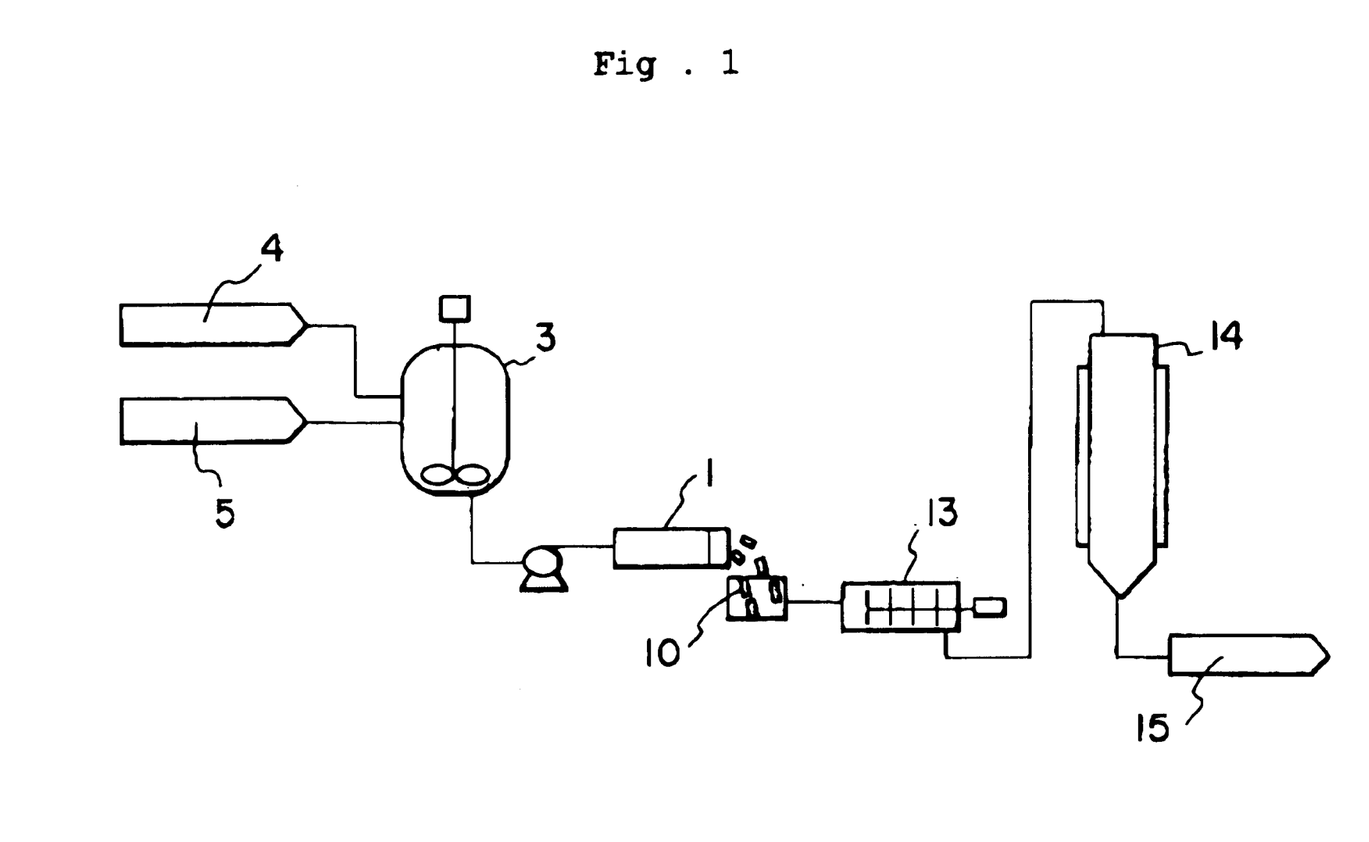
FIG. 1 is a graphic view showing a process flow chart of one embodiment of the method of the invention, in which is used a prepolymer-shaping machine equipped with a tubular condenser.
Figure 3:
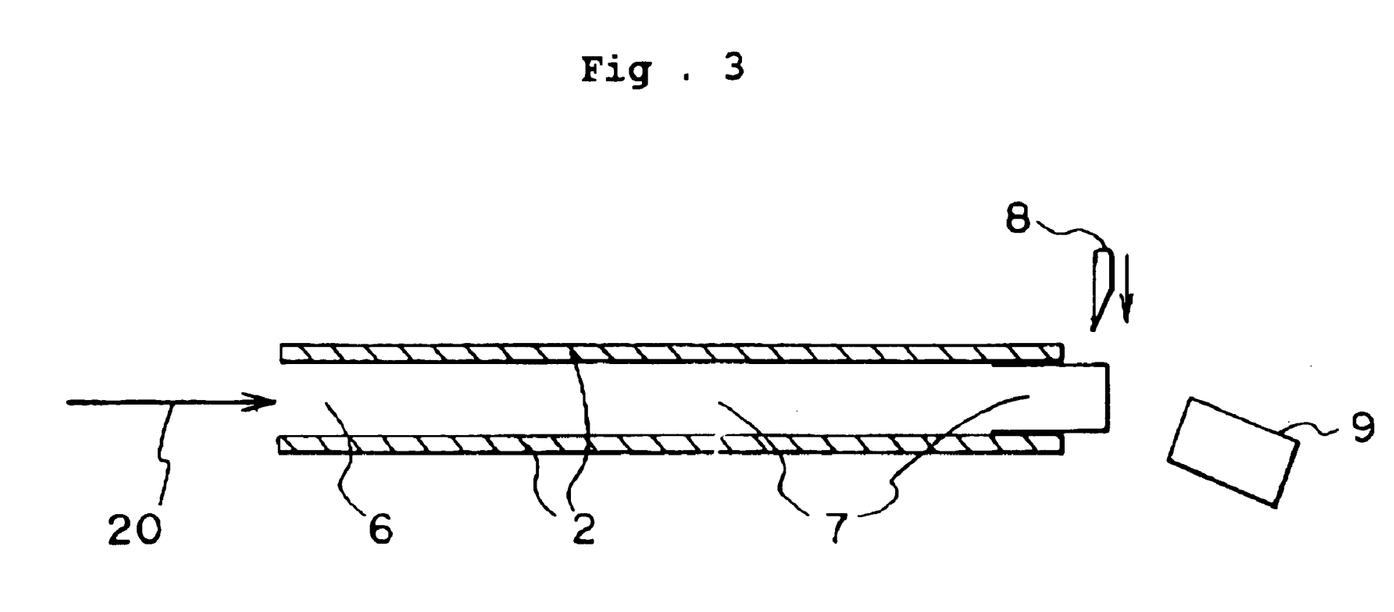
FIG. 3 is a graphic view showing the inside part of the tubular condenser to be in the prepolymer-shaping machine.

For this method, referred to are FIG. 1 and FIG. 3, in which is used a crystallizing and shaping device 1 comprising tubular condensers 2. A prepolymer solution 6 comprising a polycarbonate prepolymer 4 and a solvent 5 is prepared in a dissolution tank 3, and is introduced under pressure into the condenser 2 in the direction 20. In the condenser 2, the prepolymer solution 6 is externally cooled, whereby its temperature is lowered from the inlet of the condenser 2 toward the outlet thereof to give a polycarbonate prepolymer precipitate 7. The amount of the precipitate 7 increases from the inlet toward the outlet, thereby forming a prepolymer precipitate distribution profile in which the precipitate concentration is rich near the outlet. The sherbet-like polycarbonate prepolymer thus formed near the outlet is extruded out through the outlet, and cut with a cutter 8 into pellets 9.

The prepolymer solution introduced into the condenser 2 is crystallized therein in the absence of shear stress into prepolymer crystals having a grain size of from 0.1 to 50 μm, which are primary grains for the granular prepolymer 10.

The inner diameter of the condenser 2 is defined, depending on the size of the prepolymer pellets to be formed, and may be generally from 0.1 to 10 mm, but preferably from 1 to 5 mm. If the inner diameter is smaller than 0.1 mm, the pellets formed may form fine powder while they are handled, and will be fused during solid-phase polymerization. If, however, it is larger than 10 mm, the polymerization rate of such large pellets of prepolymer will be low. The inner diameter of the condenser 2 is made constant throughout it from its inlet to outlet. The cross-sectional profile of the condenser 2 is not specifically defined. Regarding its length, if the condenser 2 is shorter than 1 cm, the prepolymer could not be cooled sufficiently due to heat transfer failure and will therefore precipitate insufficiently. If, however, the condenser 2 longer than 5 m, it will be clogged by the prepolymer, for which the pressure to be applied to the prepolymer solution must be increased.

The inner surface of the condenser 2 is preferably coated with Teflon, as improving the releasability of the granular prepolymer formed.

The granular prepolymer thus formed preferably has a degree of crystallinity of from 10 to 45%. The granular prepolymer having a degree of crystallinity of smaller than 10% has a low melting point, and this will fuse in high-rate solid-phase polymerization in which the prepolymer is heated at relatively high temperatures. Even if the granular prepolymer formed has a degree of crystallinity of larger than 45%, there occur no problems in the polymerization of the prepolymer. For this, however, the time for cooling and precipitating the prepolymer with such high crystallinity shall be too long, which is disadvantageous in view of the equipment for the crystallization.

The other method is claimed in claim 5, and is as follows:

(c-2) A method for producing a granular polycarbonate prepolymer for solid-phase polymerization, wherein drops of a hot prepolymer solution are contacted with cooling gas to make the prepolymer crystallized.

Figure 4:
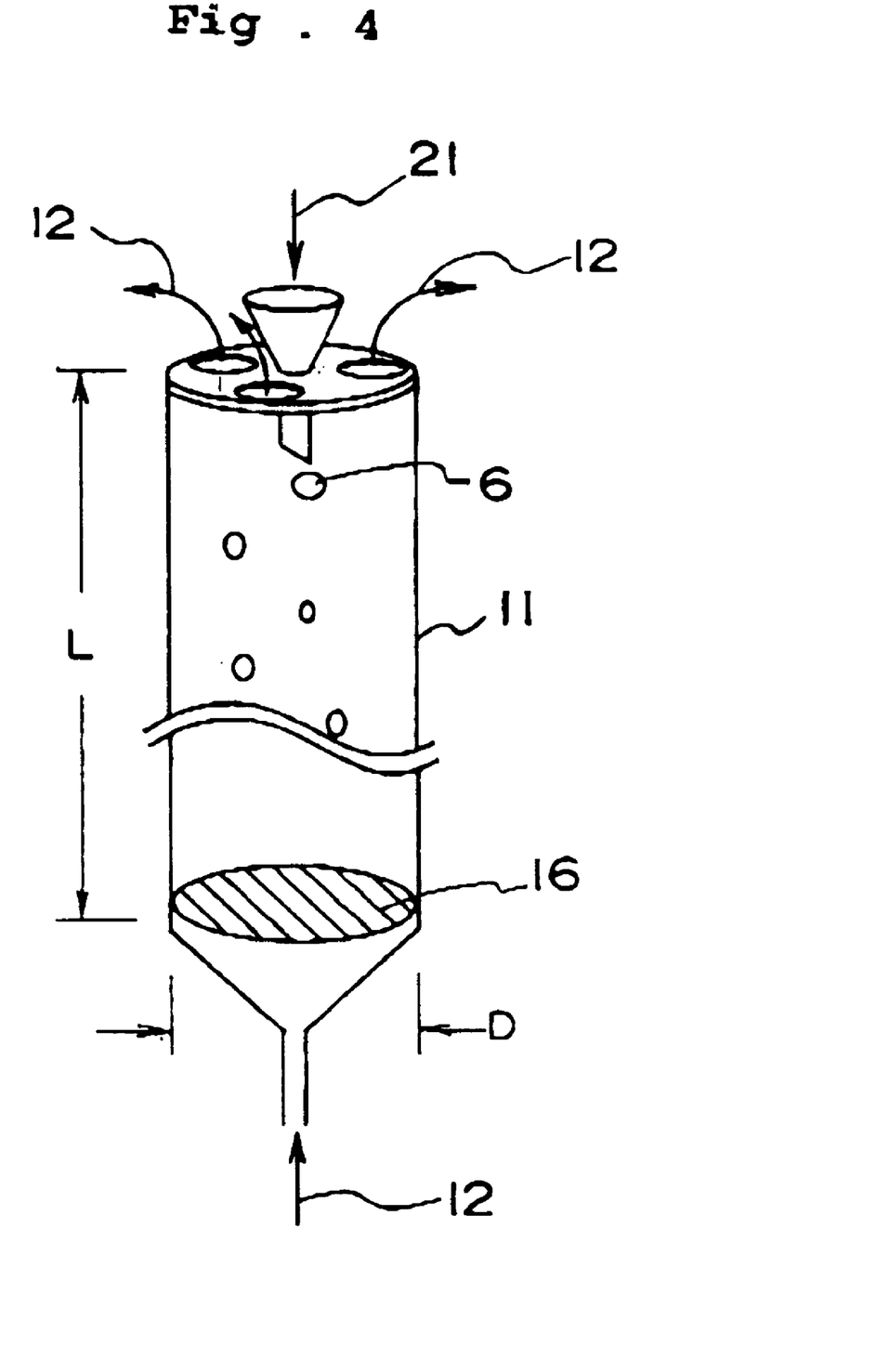
FIG. 4 is a graphic view showing the inside part of the prilling granulator.

One embodiment of this method is illustrated in FIG. 4, in which is used a prilling granulator 11. The overall process using the granulator 11 is in FIG. 2.

In this method, a polycarbonate prepolymer solution 6 is dropped into the granulator 11 in the direction 21, and is cooled and solidified therein. The cooled and solidified prepolymer is collected on the net 16, and taken out of the granulator 11 through a tubular collector (not shown). Cooling gas 12 is introduced into the granulator 11. The cooling gas 12 is not specifically defined and may be any of inert gases, such as nitrogen, argon and carbon dioxide; lower aliphatic saturated hydrocarbons such as methane, ethane, propane and butane; and lower aliphatic unsaturated hydrocarbons such as ethylene, propylene, butene and pentene.

This method may apply to prepolymer solution of which the prepolymer concentration varies in a wide range. Depending on the concentration of the prepolymer solution to be processed according to this method, the amount of the coolant to be applied to the prilling granulator is varied and the drops of the prepolymer solution having introduced into the granulator can be crystallized. The granular prepolymer obtained in this method comprises spherical grains.

(d) Step of Drying Granular Prepolymer

Figure 2:
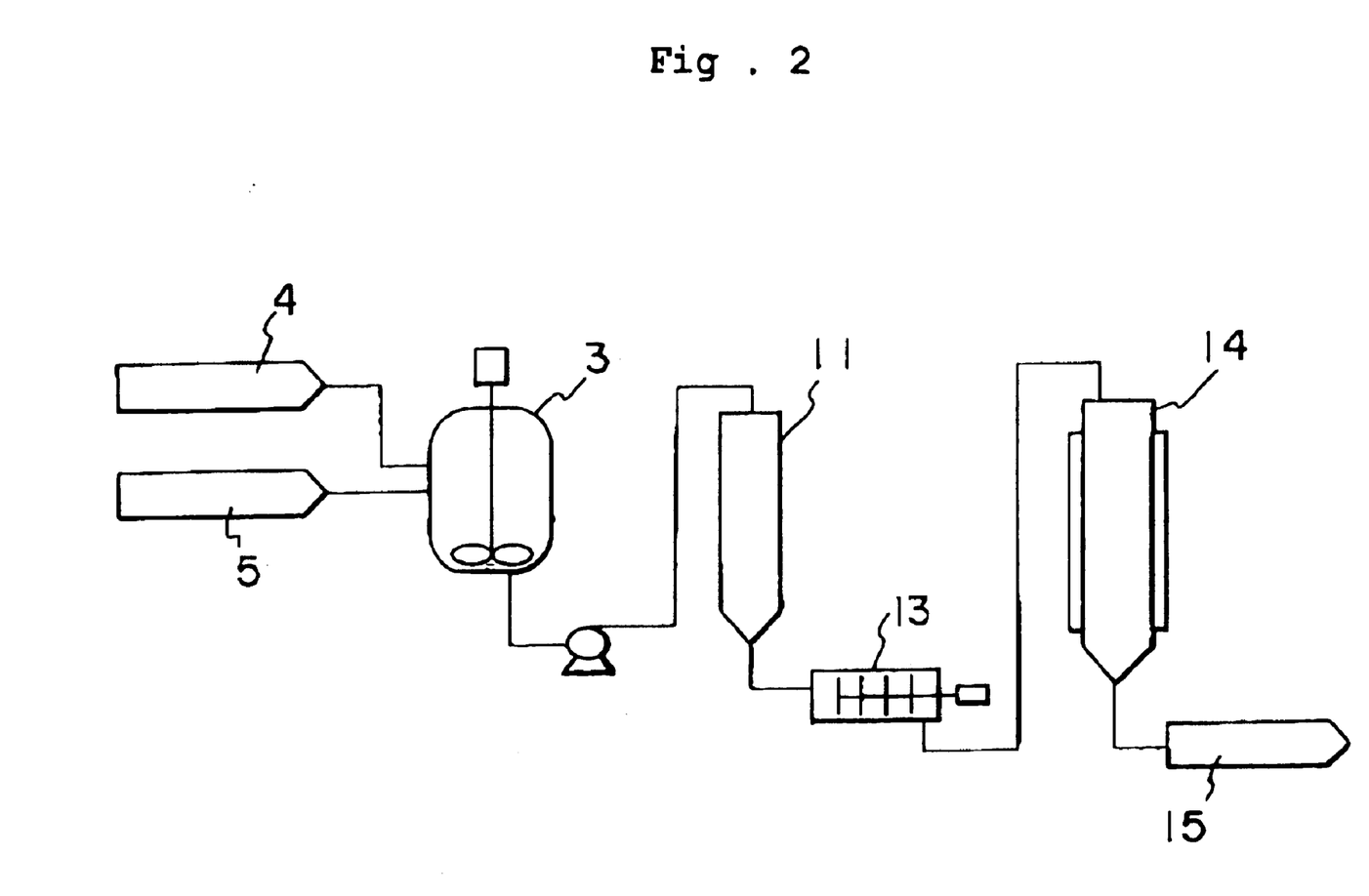
FIG. 2 is a graphic view showing a process flow chart of another embodiment of the method of the invention, in which is used prilling granulator.

The granular prepolymer obtained in the previous step is dried in a drier 13 to remove the solvent through vaporization.

Though depending on the solvent used, the drying temperature may fall generally between 30 and 230° C., but preferably between 50 and 200° C. If the drying temperature is too low, much time is taken for removing the solvent. If so, in addition, the granular prepolymer dissolves in the remaining solvent or fuses by itself to reduce its specific surface area when it is heated in the next polymerization step, and, as a result, the polymerization rate is reduced.

The drying may be effected under heat, or in a nitrogen stream, or under reduced pressure, or even in their combination, either batch-wise and/or continuously.

Though depending on the solvent used, the thus-dried granular prepolymer preferably has a liquid content of not larger than 30% by weight of the wet base, but preferably not larger than 20% by weight of the wet base. If its liquid content is larger than 30% by weight of the wet base, the prepolymer dissolves in the remaining solvent during polymerization to reduce its specific surface area, after all resulting in that the polymerization rate is reduced, or the prepolymer fuses into masses to lower the fluidity of the prepolymer in the polymerization reactor.

Where the granular prepolymer obtained in the previous shaping step is not larger than 30% by weight of the wet base, the drying step may be omitted.

The drier 13 is not specifically defined. For example, employable is any of horizontal stirrers, vertical stirrers, fixed bed driers and fluidized bed driers.

The method of the invention for producing a granular polycarbonate prepolymer for solid-phase polymerization is described hereinabove, and the properties of the granular prepolymer produced are mentioned below.

Preferably, the granular prepolymer has a degree of crystallinity of from 10 to 45%. The granular prepolymer having a degree of crystallinity of smaller than 10% has a low melting point, and this fuses during high-rate polymerization that requires high temperatures. Even if the granular prepolymer formed has a degree of crystallinity of larger than 45%, there occur no substantial problems in the polymerization of the prepolymer. For this, however, the time for cooling and precipitating the prepolymer with such high crystallinity shall be too long, which is disadvantageous.

The degree of crystallinity of the prepolymer was calculated from the heat of fusion thereof, which was measured with a Perkin-Elmer's device, in accordance with the following equation.

$$\text{Degree of Crystallinity (\%)} = [\text{Heat of Fusion } (J/g)]/[\text{Heat of Fusion for Overall Crystallization } (J/g)] \times 100$$

Also preferably, the granular prepolymer has a specific surface area of not smaller than 1 $m^2/g$. If its specific surface area is smaller than 1 $m^2/g$, the prepolymer could not be polymerized at a high rate.

The specific surface area of the prepolymer was measured, using a Cantersorb (by Yuasa Batteries), according to the BET method using nitrogen gas.

Also preferably, the granular prepolymer has a center grain size of from 0.1 to 10 mm, more preferably from 1 to 5 mm. Smaller grains than 0.1 mm are undesirable, as forming much fine powder during handling and often fusing during polymerization. Larger grains than 10 mm are also unfavorable, as being unable to polymerize at a high rate.

The compression breaking strength of the granular prepolymer may be from 1 to 100 $kgf/cm^2$, and it is larger when the prepolymer is produced from a prepolymer solution having a higher concentration. The compression breaking strength was obtained as follows. Pellets or spheres of the granular prepolymer obtained according to the method of the invention are dried, and stress was imparted thereto in the radial direction whereupon the stress intensity at which they were broken at a rate of 1 mm/min was measured. This indicates the compression breaking strength.

To measure the compression breaking strength, used was a direct shear tester for powder, DS-086 Model (by Tsutsui Rikagaku Kikai).

The amount of fine powder to be in the granular prepolymer is desirably not larger than 5% by weight, more preferably not larger than 1% by weight. Existing too much fine powder in the granular prepolymer causes partial fusion of the prepolymer during solid-phase polymerization.

The amount, % by weight, of fine powder of small grains not larger than 100 $\mu$m in size was measured through sieving of the granular prepolymer. The measurement was made just after drying the granular prepolymer or prior to putting it into polymerization reactor. Every time in handling it, the granular prepolymer produces new fine powder. However, since it is difficult to strictly determine the amount of fine powder to be in different granular prepolymers as prepared separately and handled differently, it is considered that repeated handling of the granular prepolymer as produced according to the method of the invention has no substantial influence on the formation of new fine powder having formed through the repeated handling of the prepolymer. Therefore, employed herein is the simple method of measuring the amount of fine powder as above.

The properties of some samples of the granular prepolymer of the invention as produced in the embodiments noted above are shown in Table 1.

TABLE 1

Properties of Columnar Pellets Formed through Condenser [Method (c-1)]

| | |
|---|---|
| Size: | Diameter: 0.1 to 10 mm$\phi$ |
| | Length: (diameter) × 0.5 ≤ L < (diameter) × 5 |
| Specific Surface Area: | not smaller than 1 m$^2$/g |
| Degree of Crystallinity: | 10 to 45% |
| Compression Breaking Strength: | 1 to 100 kgf/cm$^2$ |
| Amount of Fine Powder: | not greater than 5% by weight |

Properties of Spheres Formed in Prilling Granulator [Method (c-2)]

| | |
|---|---|
| Profile: | Spheres |
| Grain Size: | 0.1 to 10 mm |
| Specific Surface Area: | not smaller than 1 m$^2$/g |
| Degree of Crystallinity: | 10 to 45% |
| Compression Breaking Strength: | 1 to 100 kgf/cm$^2$ |
| Amount of Fine Powder: | not greater than 5% by weight |

Now referred to is solid-phase polymerization of the granular polycarbonate prepolymer obtained in the invention.

The granular polycarbonate prepolymer obtained herein may be polymerized through ordinary solid-phase polymerization into a polycarbonate 15 having a high molecular weight, using, for example, a solid-phase polymerizer 14.

The solid-phase polymerization may be effected either batch-wise and/or continuously, by heating and polymerizing the prepolymer in vacuum; or by heating and polymerizing the prepolymer in a nitrogen stream; or by heating and polymerizing the prepolymer while swelling it with vapor of a good solvent (see Japanese Patent Application Nos. Hei-7-17230 and Hei-7-17283).

The polymerization temperature may fall between 100 and 280° C., but preferably between 140 and 250° C. The polymerization may be effected at such a high temperature, provided that the prepolymer grains do not fuse together. The reaction time varies, depending on the molecular weight of the polymer to be obtained, but generally falls between 2 and 50 hours.

Now the invention is described in more detail with reference to the following Examples.

EXAMPLE 1

To prepare a polycarbonate prepolymer, 5.2 kg of diphenyl carbonate (DPC) and 5.0 kg of bisphenol A (BPA) were fed into a 20-liter stainless container equipped with a stirrer. This was fully purged with nitrogen, and TMAH (tetramethylammonium hydroxide) was added thereto in an amount of 1×10$^{-4}$ mol/mol of BPA. After having been mixed and melted at 180° C., these were reacted with further stepwise heating them and stepwise reducing the pressure. Finally at 250° C. and 10 Torr, these were reacted for 2 hours to give a transparent viscous prepolymer. Its molecular weight was measured to be Mv=5600 (–), and the ratio of the phenyl terminal to the hydroxyl terminal in this was 56/44.

Next, 100 g of p-xylene was added to 100 g of this prepolymer, and stirred at 150° C. while the evaporating p-xylene was refluxed using a condenser.

The resulting solution was introduced under suction into a Teflon tube having an inner diameter of 2$\phi$, and cooled therein, in which the prepolymer precipitated and solidified. Then, the resulting strand of the thus solidified prepolymer was extruded outside the tube and cut at a length of about 4 mm to obtain pellets of 2$\phi$×4 mm in size. 50 g of those pellets were put into a 200-ml autoclave equipped with a helical stirrer, and stirred therein at 15 rpm, while being heated in an oil bath at 100° C. for 10 hours, with reducing the pressure in the autoclave to –600 mmHg, whereby the pellets were dried. The dried pellets were sieved, and the amount of fine powder (of small grains having a grain size of not larger than 100 $\mu$m) in those pellets was measured to be 0.3% by weight. The specific surface area of the pellets was measured to be 11.6 m$^2$/g.

10 g of the pellets were fed into a SUS container having an inner diameter of 20 mm$\phi$ and a length of 100 mm, and heated at 220° C. while nitrogen was introduced thereinto at a flow rate of 1.5 N liters/min. Thus, the pellets were polymerized in solid phase for 10 hours. After this, the inside of the SUS tube was checked, and no fusion of pellets was found. It was easy to take out the thus-polymerized, granular polymer from the tube. The molecular weight of the granular polymer was measured to be Mv=30400 (–).

EXAMPLE 2

The granular prepolymer prepared in Example 1 was polymerized in solid phase in the same manner as in Example 1, except that the polymerization temperature was not 220° C. but 230° C. No fusion of pellets was found. It was easy to take out the granular polymer from the tube. Its molecular weight was measured to be Mv=27300 (–)

EXAMPLE 3

10 g of pellets of the granular prepolymer prepared in Example 1 were fed into a SUS container having an inner diameter of 20 mm$\phi$ and a length of 100 mm, and heated at 220° C. while a vapor mixture of p-xylene/heptane (1/1, by weight) was introduced thereinto at a flow rate of 20 g/hr. Thus, the pellets were polymerized, while being swollen, for 3 hours. After this, the inside of the SUS tube was checked, and no fusion of pellets was found. It was easy to take out the thus-polymerized, granular polymer from the tube. The molecular weight of the granular polymer was measured to be Mv=34400 (–).

EXAMPLE 4

28 g of p-xylene and 2 g of n-nonane were added to 30 g of the prepolymer prepared in Example 1, and stirred at 150° C. while the vaporizing solvents were refluxed using a condenser.

Next, the resulting solution was processed in the same manner as in Example 1 to obtain pellets, which were then polymerized in solid phase.

EXAMPLE 5

A strand prepolymer was prepared in the same manner as in Example 1, cut at a length of about 4 mm, and put into a 500-ml beaker containing therein 300 ml of heptane. Thus were obtained prepolymer pellets of 2φ×4 mm in size. These were dried and polymerized in solid phase in the same manner as in Example 1.

EXAMPLES 6 to 21

Changing the process of preparing prepolymer, the condition for dissolving it, and the condition for granulating the prepolymer solution, various granular prepolymers were prepared, and polymerized in solid phase. The conditions employed and the results obtained are shown in Table 2 and Table 3.

EXAMPLE 7

30 g of the prepolymer prepared in Example 1 and 14 g of p-xylene were put into a 100-ml stainless pressure container, which was then purged with nitrogen, sealed and heated. These were stirred for 2 hours with the inner temperature of the container being kept all the time at 160° C. During this, the inner pressure which was initially at highest 1.5 atms was reduced to normal pressure.

Next, the resulting prepolymer solution was processed in the same manner as in Example 1 to obtain pellets, which were polymerized in solid phase.

EXAMPLE 18

Prepared were 250 g of 100% phenyl-terminated polycarbonate prepolymer (Mv=4350) and 350 g of 100% hydroxyl-terminated polycarbonate prepolymer (Mv=7360) through conventional interfacial polycondensation. These were mixed in a ratio of 50 mol %/50 mol % of the terminals of the two, and dissolved in methylene chloride, and then washed with 0.1 N sodium hydroxide, 0.1 N hydrochloric acid, and pure water in that order. Next, the organic phase was separated and re-precipitated in heptane to obtain a polycarbonate prepolymer having Mv=6200, in which the ratio of the terminals, phenyl terminal/hydroxyl terminal, was 52/48.

An aqueous solution of TMAH (tetramethylammonium hydroxide) was added to this polycarbonate prepolymer, the amount of TMAH being added was $1 \times 10^{-4}$ mol/mol of BPA. Then, this was processed in the same manner as in Example 1 to obtain pellets of the prepolymer. The pellets were polymerized in solid phase in the same manner as in Example 1.

EXAMPLE 20

The p-xylene solution of prepolymer that had been prepared in Example 1 was dropped into a prilling granulator, such as that shown in FIG. 4, having an inner diameter, D, of 30 cm and a height, L, of 10 m, through its top. In the granulator, the solution was cooled and solidified by nitrogen having introduced thereinto through its bottom at a flow rate of 0.5 m/sec. Thus were formed prepolymer spheres. These were dried under reduced pressure in the same manner as in Example 1. The dried spheres had a specific surface area of 8.5 $m^2/g$ and a mean grain size of 2.2 mm, and contained 2.1% by weight of fine powder (of small grains having a grain size of not larger than 100 μm). These were polymerized in solid phase in the same manner as in Example 1.

EXAMPLE 21

The prepolymer solution was dropped into the prilling granulator, and cooled and solidified therein, in the same manner as in Example 20 except that the resulting solid drops were put into one-liter beaker filled with heptane. Thus were obtained spheres of the prepolymer. These had a specific surface area of 12.3 $m^2/g$ and a mean grain size of 2.5 mm. Next, these were dried and polymerized in solid phase in the same manner as in Example 1.

EXAMPLE 22

50 g of wet prepolymer pellets as prepared in the same manner as in Example 1 were put into a 200-ml autoclave equipped with a helical stirrer, and stirred therein at 30 rpm, while being heated in an oil bath at 100° C. for 10 hours, with reducing the pressure in the autoclave to −600 mmHg, whereby the pellets were dried. The dried pellets were sieved, and the amount of fine powder (of small grains having a grain size of not larger than 100 μm) in those pellets was measured to be 0.9% by weight. The specific surface area of the pellets was measured to be 12.1 $m^2/g$. Next, these pellets were polymerized in solid phase in the same manner as in Example 1.

Comparative Example 1

50 g of the solid prepolymer that had been prepared in Example 1 and 80 g of acetone were put into a small-sized stainless mill, and wet-milled therein at a high stirring rate of 1000 rpm for 10 minutes. The precipitate was separated from the resulting suspension through filtration, and dried in the same manner as in Example 1. This was sieved, and the amount of fine powder (of small grains having a grain size of not larger than 100 μm) was measured to be 30.9% by weight. The mean grain size of the granular prepolymer obtained herein was measured to be 0.5 mm, and the specific surface area thereof was 0.4 $m^2/g$. This was polymerized in solid phase in the same manner as in Example 1. Some polymer grains formed herein fused together and adhered to the inner wall of the SUS container, and it was not easy to take out the polymer from the container. The molecular weight of the polymer was measured to be Mv=20600 (−).

Comparative Example 2

The granular prepolymer prepared in Comparative Example 1 was polymerized in solid phase at 230° C.

Observing the inside of the SUS tube after the polymerization, the polymer grains fused together in masses (these were in semi-transparent, semi-fused condition). It was difficult to take out the polymer from the SUS tube. The molecular weight of the polymer was measured to be Mv=14600 (−).

Measuring Methods

The degree of crystallinity of prepolymer was calculated from the heat of fusion thereof, which was measured with a Perkin-Elmer's device, in accordance with the following equation.

$$\text{Degree of Crystallinity (\%)} = [\text{Heat of Fusion } (J/g)]/[\text{Heat of Fusion for Overall Crystallization } (J/g)] \times 100$$

The specific surface area of prepolymer was measured, using a Cantersorb (by Yuasa Batteries), according to the BET method using nitrogen gas.

The amount, % by weight, of fine powder of small grains not larger than 100 μm in size was measured through sieving of granular prepolymer. The measurement was made just after drying granular prepolymer or prior to putting it into polymerization reactor.

TABLE 2

|  | Oligomer Preparation | Properties of Oligomer | | Dissolution Condition | | |
|---|---|---|---|---|---|---|
|  |  | Mv (-) | —Ph/—OH (mol/mol) | Concentration (wt. %) | Solvent | Temperature, Pressure |
| Example 1 | melt polymerization | 5600 | 56/44 | 50 | p-xylene | 150° C., normal pressure |
| Example 2 | melt polymerization | 5600 | 56/44 | 50 | p-xylene | 150° C., normal pressure |
| Example 3 | melt polymerization | 5600 | 56/44 | 50 | p-xylene | 150° C., normal pressure |
| Example 4 | melt polymerization | 5600 | 56/44 | 50 | p-Xy + C9 | 150° C., normal pressure |
| Example 5 | melt polymerization | 5600 | 56/44 | 50 | p-xylene | 150° C., normal pressure |
| Example 6 | melt polymerization | 5600 | 56/44 | 31 | p-xylene | 150° C., normal pressure |
| Example 7 | melt polymerization | 5600 | 56/44 | 68 | p-xylene | 160° C., 1.5 atms |
| Example 8 | melt polymerization | 5600 | 56/44 | 81 | p-xylene | 220° C., 6 atms |
| Example 9 | melt polymerization | 5600 | 56/44 | 50 | p-xylene | 150° C., normal pressure |
| Example 10 | melt polymerization | 5600 | 56/44 | 50 | p-xylene | 150° C., normal pressure |
| Example 11 | melt polymerization | 5600 | 56/44 | 50 | p-xylene | 150° C., normal pressure |
| Example 12 | melt polymerization | 5600 | 56/44 | 50 | benzene | 130° C., 4 atms |
| Example 13 | melt polymerization | 5600 | 56/44 | 53 | toluene | 130° C., 2 atms |
| Example 14 | melt polymerization | 5600 | 56/44 | 50 | mesitylene | 160° C., normal pressure |
| Example 15 | melt polymerization | 2800 | 52/48 | 50 | p-xylene | 140° C., normal pressure |
| Example 16 | melt polymerization | 12300 | 60/40 | 50 | p-xylene | 160° C., 1.5 atms |
| Example 17 | melt polymerization | 17600 | 56/44 | 50 | p-xylene | 200° C., 4 atms |
| Example 18 | Interlacial polymerization | 6200 | 52/48 | 50 | p-xylene | 150° C., normal pressure |
| Example 19 | Interlacial polymerization | 7300 | 49/51 | 50 | p-xylene | 150° C., normal pressure |
| Example 20 | melt polymerization | 5600 | 56/44 | 50 | p-xylene | 150° C., normal pressure |
| Example 21 | melt polymerization | 5600 | 56/44 | 50 | p-xylene | 150° C., normal pressure |
| Example 22 | melt polymerization | 5600 | 56/44 | 50 | p-xylene | 150° C., normal pressure |
| Comparative Example 1 | melt polymerization | 5600 | 56/44 | — | — | — |
| Comparative Example 2 | melt polymerization | 5600 | 56/44 | — | — | — |

|  | Granulation Condition | |
|---|---|---|
|  | Shaping Method | Treatment after Shaping |
| Example 1 | cooling in 2 φ Teflon tube | reduced pressure drying (−600 mmHg, 10 hrs, 15 rpm) |
| Example 2 | cooling in 2 φ Teflon tube | reduced pressure drying (−600 mmHg, 10 hrs, 15 rpm) |
| Example 3 | cooling in 2 φ Teflon tube | reduced pressure drying (−600 mmHg, 10 hrs, 15 rpm) |
| Example 4 | cooling in 2 φ Teflon tube | reduced pressure drying (−600 mmHg, 10 hrs, 15 rpm) |
| Example 5 | cooling in 2 φ Teflon tube | heptane treatment followed by reduced pressure drying |
| Example 6 | cooling in 2 φ Teflon tube | reduced pressure drying (−600 mmHg, 10 hrs, 15 rpm) |
| Example 7 | cooling in 2 φ Teflon tube | reduced pressure drying (−600 mmHg, 10 hrs, 15 rpm) |
| Example 8 | cooling in 2 φ Teflon tube | reduced pressure drying (−600 mmHg, 10 hrs, 15 rpm) |
| Example 9 | cooling in 5 φ Teflon tube | reduced pressure drying (−600 mmHg, 10 hrs, 15 rpm) |
| Example 10 | 6 φ SUS tube | reduced pressure drying (−600 mmHg, 10 hrs, 15 rpm) |
| Example 11 | 10 φ SUS tube | reduced pressure drying (−600 mmHg, 10 hrs, 15 rpm) |
| Example 12 | cooling in 2 φ Teflon tube | reduced pressure drying (−600 mmHg, 10 hrs, 15 rpm) |
| Example 13 | cooling in 2 φ Teflon tube | reduced pressure drying (−600 mmHg, 10 hrs, 15 rpm) |
| Example 14 | cooling in 2 φ Teflon tube | reduced pressure drying (−600 mmHg, 10 hrs, 15 rpm) |
| Example 15 | cooling in 2 φ Teflon tube | reduced pressure drying (−600 mmHg, 10 hrs, 15 rpm) |
| Example 16 | cooling in 2 φ Teflon tube | reduced pressure drying (−600 mmHg, 10 hrs, 15 rpm) |
| Example 17 | cooling in 2 φ Teflon tube | reduced pressure drying (−600 mmHg, 10 hrs, 15 rpm) |
| Example 18 | cooling in 2 φ Teflon tube | reduced pressure drying (−600 mmHg, 10 hrs, 15 rpm) |
| Example 19 | cooling in 2 φ Teflon tube | reduced pressure drying (−600 mmHg, 10 hrs, 15 rpm) |
| Example 20 | Prilling | reduced pressure drying (−600 mmHg, 10 hrs, 15 rpm) |
| Example 21 | Prilling | heptane treatment followed by reduced pressure drying |
| Example 22 | cooling in 2 φ Teflon tube | reduced pressure drying (−600 mmHg, 10 hrs, 30 rpm) |
| Comparative Example 1 | milling in acetone | reduced pressure drying (−600 mmHg, 10 hrs, 15 rpm) |
| Comparative Example 2 | milling in acetone | reduced pressure drying (−600 mmHg, 10 hrs, 15 rpm) |

TABLE 3

| | Properties of Granular Prepolymer | | | | | | |
|---|---|---|---|---|---|---|---|
| | | Fine Powder | Polymerization Condition | | | After Polymerization | |
| | Specific Surface Area (m2/g) | Content (wt. %)(*1) | Gas Introduced | Temperature (°C.) | Time (hrs) | Final Mv | Degree of Fusion (*2) |
| Example 1 | 11.6 | 0.3 | N2 | 220 | 10 | 30400 | 1 |
| Example 2 | 11.6 | 0.3 | N2 | 230 | 10 | 27300 | 2 |
| Example 3 | 11.6 | 0.3 | p-Xy/C7 | 220 | 3 | 34400 | 1 |
| Example 4 | 15.2 | 0.6 | N2 | 220 | 10 | 31500 | 1 |
| Example 5 | 28.2 | 0.4 | N2 | 220 | 10 | 33700 | 1 |
| Example 6 | 16.5 | 1.2 | N2 | 220 | 10 | 31700 | 1 |
| Example 7 | 8.0 | 0.2 | N2 | 220 | 10 | 28800 | 1 |
| Example 8 | 2.9 | 0.2 | N2 | 220 | 10 | 26300 | 1 |
| Example 9 | 9.2 | 0.3 | N2 | 220 | 10 | 29400 | 1 |
| Example 10 | 7.3 | 0.4 | N2 | 220 | 10 | 27700 | 1 |
| Example 11 | 7.0 | 0.4 | N2 | 220 | 10 | 25900 | 1 |
| Example 12 | 10.9 | 0.3 | N2 | 220 | 10 | 28900 | 1 |
| Example 13 | 14.3 | 0.5 | N2 | 220 | 10 | 31300 | 1 |
| Example 14 | 10.8 | 0.5 | N2 | 220 | 10 | 28300 | 1 |
| Example 15 | 13.3 | 1.3 | N2 | 220 | 10 | 24100 | 2 |
| Example 16 | 10.1 | 0.2 | N2 | 220 | 10 | 36200 | 1 |
| Example 17 | 5.6 | 0.2 | N2 | 220 | 10 | 40900 | 1 |
| Example 18 | 12.3 | 0.4 | N2 | 220 | 10 | 29900 | 1 |
| Example 19 | 9.9 | 0.5 | N2 | 220 | 10 | 31600 | 1 |
| Example 20 | 8.5 | 2.1 | N2 | 220 | 10 | 28700 | 2 |
| Example 21 | 12.3 | 0.9 | N2 | 220 | 10 | 30000 | 1 |
| Example 22 | 12.1 | 0.9 | N2 | 220 | 10 | 30300 | 1 |
| Comparative Example 1 | 0.4 | 30.9 | N2 | 220 | 10 | 20600 | 3 |
| Comparative Example 2 | 0.4 | 30.9 | N2 | 230 | 10 | 14600 | 4 |

(*1) Fine Powder Content: This was measured just after drying the granular prepolymer, and indicates percentage by weight of fine powder of small grains of not larger than 100 μm in size, existing in dry granular prepolymer.
(*2) Degree of Fusion: 1: No fusion found. 2: Little fusion found. 3: Some fusion found. 4: Much fusion found. 5: Extreme fusion found.

Industrial Applicability

According to the present invention, produced is good granular polycarbonate prepolymer which is favorably usable in solid-phase polymerization to give polycarbonate. The granular prepolymer obtained in the invention is polymerized in solid phase at a high rate, and the prepolymer grains do not fuse together during polymerization. The granular prepolymer is easy to handle.

We claim:

1. A method for producing polycarbonate prepolymer pellets for solid-phase polymerization, comprising dissolving a polycarbonate prepolymer in a solvent to form a prepolymer solution, passing the prepolymer solution through a tubular condenser to crystallize it into strands, and reducing said crystallized strands to predetermined lengths.

2. A method for producing a granular polycarbonate prepolymer for solid-phase polymerization, comprising dissolving a polycarbonate prepolymer in a solvent to form a prepolymer solution, contacting the prepolymer solution with a cooling gas to crystallize the prepolymer and granulating the crystallized prepolymer.

3. A method for producing a granular polycarbonate prepolymer for solid-phase polymerization as claimed in claim 1, wherein the solvent is an aromatic solvent or a mixture of an aromatic solvent and a poor solvent for the polycarbonate prepolymer.

4. A method for producing a granular polycarbonate prepolymer for solid-phase polymerization as claimed in claim 2, wherein the solvent is an aromatic solvent or a mixture of an aromatic solvent and a poor solvent for the polycarbonate prepolymer.

5. A method for producing a granular polycarbonate prepolymer for solid-phase polymerization as claimed in claim 3, wherein the solvent is an aromatic solvent.

6. A method for producing a granular polycarbonate prepolymer for solid-phase polymerization as claimed in claim 4, wherein the solvent is an aromatic solvent.

7. A method for producing a granular polycarbonate prepolymer for solid-phase polymerization as claimed in claim 5, wherein the aromatic solvent is selected from the group consisting of benzene, toluene, o-xylene, m-xylene, p-xylene, dioxane, ethylbenzene, anisole, cumene, propylbenzene, naphthylene, mesitylene, dibenzyl ether, diphenyl ether, tetrahydronaphthylene, phenanthrene, anthracene, cyclohexanone, tetrahydrofuran and mixtures thereof.

8. A method for producing a granular polycarbonate prepolymer for solid-phase polymerization as claimed in claim 6, wherein the aromatic solvent is selected from the group consisting of benzene, toluene, o-xylene, m-xylene, p-xylene, dioxane, ethylbenzene, anisole, cumene, propylbenzene, naphthylene, mesitylene, dibenzyl ether, diphenyl ether, tetrahydronaphthylene, phenanthrene, anthracene, cyclohexanone, tetrahydrofuran and mixtures thereof.

9. A method for producing a granular polycarbonate prepolymer for solid-phase polymerization as claimed in claim 1, wherein the granular polycarbonate prepolymer has a specific surface area of not smaller than 1 m$^2$/g.

10. A method for producing a granular polycarbonate prepolymer for solid-phase polymerization as claimed in claim 2, wherein the granular polycarbonate prepolymer has a specific surface area of not smaller than 1 m²/g.

11. A method for producing a granular polycarbonate prepolymer for solid-phase polymerization as claimed in claim 1, wherein the granular prepolymer contains fine powder in an amount of not larger than 5% by weight.

12. A method for producing a granular polycarbonate prepolymer for solid-phase polymerization as claimed in claim 2, wherein the granular prepolymer contains fine powder in an amount of not larger than 5% by weight.

* * * * *

UNITED STATES PATENT AND TRADEMARK OFFICE
CERTIFICATE OF CORRECTION

PATENT NO. : 5,981,051
DATED : November 9, 1999
INVENTOR(S) : Hiroaki MOTEGI et al.

It is certified that error appears in the above-identified patent and that said Letters Patent is hereby corrected as shown below:

On the title page, item [54] and the top of Column 1, the Title is incorrectly listed. It should read as follows:

--[54] METHOD FOR PRODUCING GRANULAR POLYCARBONATE PREPOLYMER FOR SOLID-PHASE POLYMERIZATION--

On the title page, item [75] is incorrectly listed. It should read as follows:

--[75] Inventors: Hiroaki Motegi; Noriyuki Kunishi; Akihiro Shishikura, all of Ichihara, Japan--

Signed and Sealed this

Second Day of January, 2001

Attest:

Attesting Officer

Q. TODD DICKINSON

Commissioner of Patents and Trademarks